United States Patent
Chambers

(10) Patent No.: US 9,644,560 B1
(45) Date of Patent: May 9, 2017

(54) EMERGENCY FORCED IDLE DEVICE

(71) Applicant: Colin Ignatius Chambers, Hempstead, NY (US)

(72) Inventor: Colin Ignatius Chambers, Hempstead, NY (US)

(*) Notice: Subject to any disclaimer, the term of this patent is extended or adjusted under 35 U.S.C. 154(b) by 0 days.

(21) Appl. No.: 14/999,612

(22) Filed: Jun. 4, 2016

Related U.S. Application Data

(60) Provisional application No. 62/388,816, filed on Feb. 8, 2016.

(51) Int. Cl.
*F02D 41/08* (2006.01)
*F02D 41/22* (2006.01)
*B60K 28/10* (2006.01)
*B60W 10/18* (2012.01)

(52) U.S. Cl.
CPC .............. *F02D 41/08* (2013.01); *B60K 28/10* (2013.01); *B60W 10/18* (2013.01); *F02D 41/22* (2013.01); *F02D 2200/602* (2013.01)

(58) Field of Classification Search
None
See application file for complete search history.

(56) References Cited

U.S. PATENT DOCUMENTS

| | | | | |
|---|---|---|---|---|
| 6,881,174 B2* | 4/2005 | McCall | .................. | B60K 28/00 477/107 |
| 2005/0197236 A1* | 9/2005 | Doering | .............. | F02D 41/0087 477/181 |
| 2010/0036566 A1* | 2/2010 | Hayami | ................ | B60W 10/06 701/48 |
| 2013/0035843 A1* | 2/2013 | Kouda | .................... | F02D 41/22 701/110 |
| 2013/0035844 A1* | 2/2013 | Iriyama | .................. | F02D 29/02 701/110 |
| 2013/0123066 A1* | 5/2013 | Tomiie | ................ | B60W 50/087 477/185 |
| 2015/0361909 A1* | 12/2015 | Kuroki | .................... | F02D 29/02 701/101 |

FOREIGN PATENT DOCUMENTS

| | | | | |
|---|---|---|---|---|
| JP | 61008442 A | * | 1/1986 | |
| JP | 61190135 A | * | 8/1986 | |
| JP | 2005291030 A | * | 10/2005 | |

* cited by examiner

*Primary Examiner* — Daniel J Colilla

(57) ABSTRACT

The Emergency Forced Idle Device aka "EFID" is a device configured to make an automotive engine idle and the brakes to work normally completely ignoring the accelerator's request for more power, although the driver is inadvertently applying both the brake and the accelerator pedals at the same time.

2 Claims, 11 Drawing Sheets

EMERGENCY FORCED IDLE DEVICE

CROSS-REFERENCE TO RELATED APPLICATIONS

This application claims a benefit to provisional patent application Ser. No. 62/388,816 Filed Feb. 8, 2016 confirmation #5485

STATEMENT REGARDING FEDERALLY SPONSORED RESEARCH OR DEVELOPMENT

Not Applicable

MICROFICHE APPENDIX

Not Applicable

BACKGROUND OF INVENTION

Field of the Invention

The effects of the automobile on everyday life is controversial. The great revolution of mobility and convenience brought about by the mass production of cars here and abroad has made it possible for huge swaths of the population of overcrowded cities to relocate to the suburbs. It has also led to the construction of thousands of miles of new roads, highways, throughways, tunnels and bridges.

With this expansion comes the safety issues. Every year thousands of people are hurt maimed and killed as a result of automobile accidents. To cope with this negative aspect of a motorized society certain safety devices over the years were invented and installed on cars trucks and busses, such as hard iron bumpers; horns; electric trafficators; bias ply tires. These safety devices have evolved into: the modern energy adsorbing honeycomb bumpers; turn signals; radial ply tires; collapsible steering shafts; ABS brakes; traction control; seat belts and air bags.

However, over the past decade it is becoming more evident that there is still an area of safety that has not been addressed. The reason could be that the problem is not often reported or is not recognized or is simply repudiated by the car manufacturers who are not certain of the ideal positioning of the brake and accelerator pedals. These pedals are spaced very close together; maybe the auto manufacturers do not want the driver's right shoe to become trapped beneath the brake pedal in an emergency.

Lately there have been reports of accidents due to: "driver error": "un-intended acceleration during braking": "errant panic circuitry"; the list goes on. Many of these accidents are the result of the driver's right shoe inadvertently overlapping and applying both the brake and the accelerator pedals at the same time, the startled driver applies more pressure on both pedals (without realizing it) resulting in a crash.

Recent news reports of two separate incidents of cars suddenly speeding up and crashing through walls of parking garages then falling several floors onto the sidewalk below, leaving the police baffled as to the cause, make it evident that more safety devices are required on our automobiles.

This new embodiment could be the solution because it sits there quietly in the engine bay and whenever the driver for whatever reason depresses both pedals (brake and accelerator) at the same time it forces the engine into idle and allows the brakes to work normally without fighting an accelerating engine. It may seem strange, farfetched or very improbable that a seasoned driver could be applying the brakes and gas at the same time without realizing it but, I had personal experience and switching off the ignition was the way I avoided a major accident.

Related Art

The use of the automobile within the modern society has become a necessity. In order to keep it safe certain devices now the related art have been invented and installed over the years. The Emergency Forced Idle Device acronym EFID is now about to enter the arsenal of safety devices to protect motorists, vehicle occupants, pedestrians and property. It is designed to prevent the accident from occurring rather than protection after impact as in the case of seat belts.

Prior Art

It is very unfortunate but it was not possible to find any kind of automotive component that performs any function similar to the EFID device, either in a written report, advertisement or online or in my 34 year career as a ASE certified technician. I have never seen any device designed to perform in this way. A throttle body has similarities but performs a different function. In my view it is the first time that this device is being introduced into this arena. It is unique and will save many lives and is long overdue.

SUMMARY OF THE INVENTION

The subject invention is a method and device that actually thinks for the driver, it sits there quietly waiting. The moment the driver inadvertently applies both pedals (brake and accelerator simultaneously), it is activated blocking off most of the induction air, just leaving the correct amount necessary to support engine idle. Sensing the low volume of air flow, the air mass sensor retards the ignition timing: at the same time the computer is instructed to deliver the correct amount of fuel necessary to support idle by the Throttle position switch 55A

DESCRIPTION OF THE DRAWINGS

These features and advantages of the invention will become better understood and appreciated by reference to the following detailed descriptions.

Figure 1:
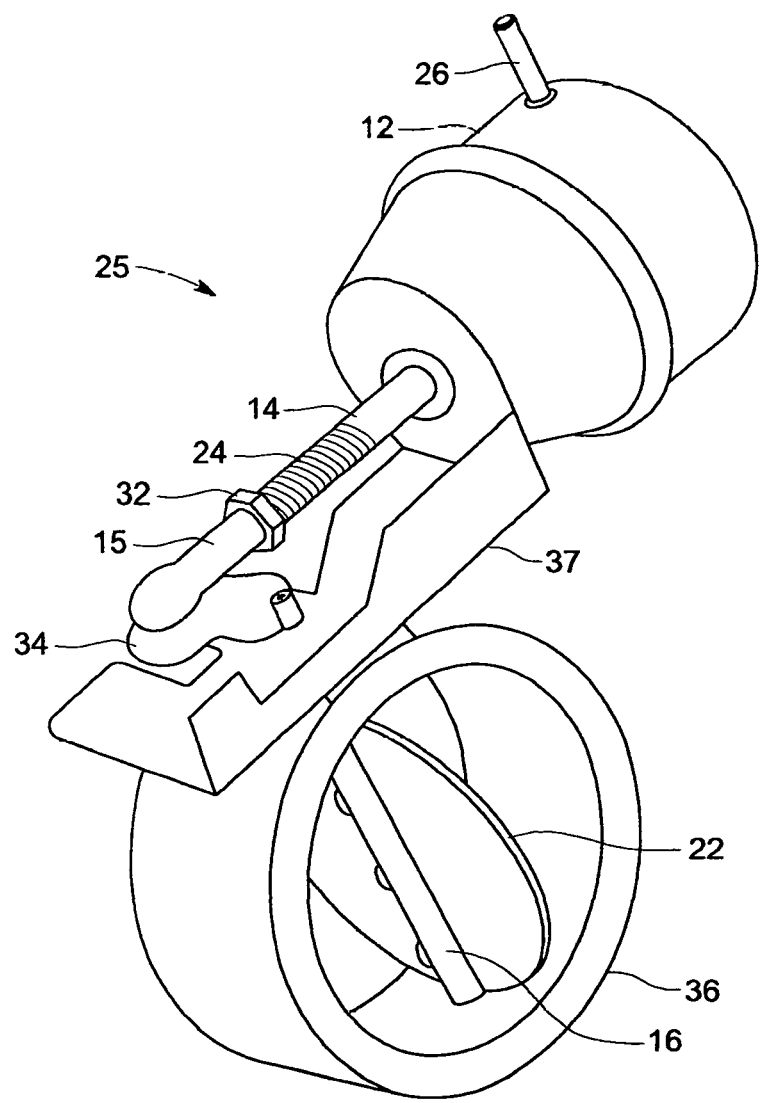
FIG. 1 is a slightly elevated and angled frontal view of the EFID 25 depicting the normal operating position of the plate 22 wide open within the body 36, the vacuum chamber 12 and the actuator rod 14 is fully extended.

REFERENCE NUMBERS IN THE DRAWINGS 12 vacuum actuator chamber
13 tension return spring
14 vacuum actuator rod
15 rod socket connector
16 shaft
17 diaphragm
22 plate
24 rod adjuster
26 vacuum actuator port
30 relay terminal
31 lever post ball connector
32 adjuster jam nut
34 shaft lever
35 fulcrum Holes
36 EFID Body
37 bracket
40 throttle position shuttle relay
51 brake light switch
52 accelerator proximity switch
53 brake light
54 vacuum control switch (Dorman 911-604 15415242)
54A vacuum port
54B vacuum port
54C vacuum port to muffler
54D muffler to atmosphere
54E 12 volt receptacle
54F atmosphere
55 throttle position switch
55A throttle position switch (ISUMO 17106681 GEGT7610-138)
56 throttle body
57 fuel injection computer (ECU)
58 air mass sensor
61 air cleaner
62 fuel injector
63 spark plug
64 idle air
85 ground terminal of relay
86 trigger terminal of relay
87 relay terminal
87A relay terminal.
25 EFID Device
89 idle air bypass adjustment screw
90 idle air passageway
91 hole
92 serration
93 5 volt reference
94 ground for reference voltage within the ECU
95 TPS input to the ECU

DETAILED DESCRIPTION OF INVENTION

Figure 2:
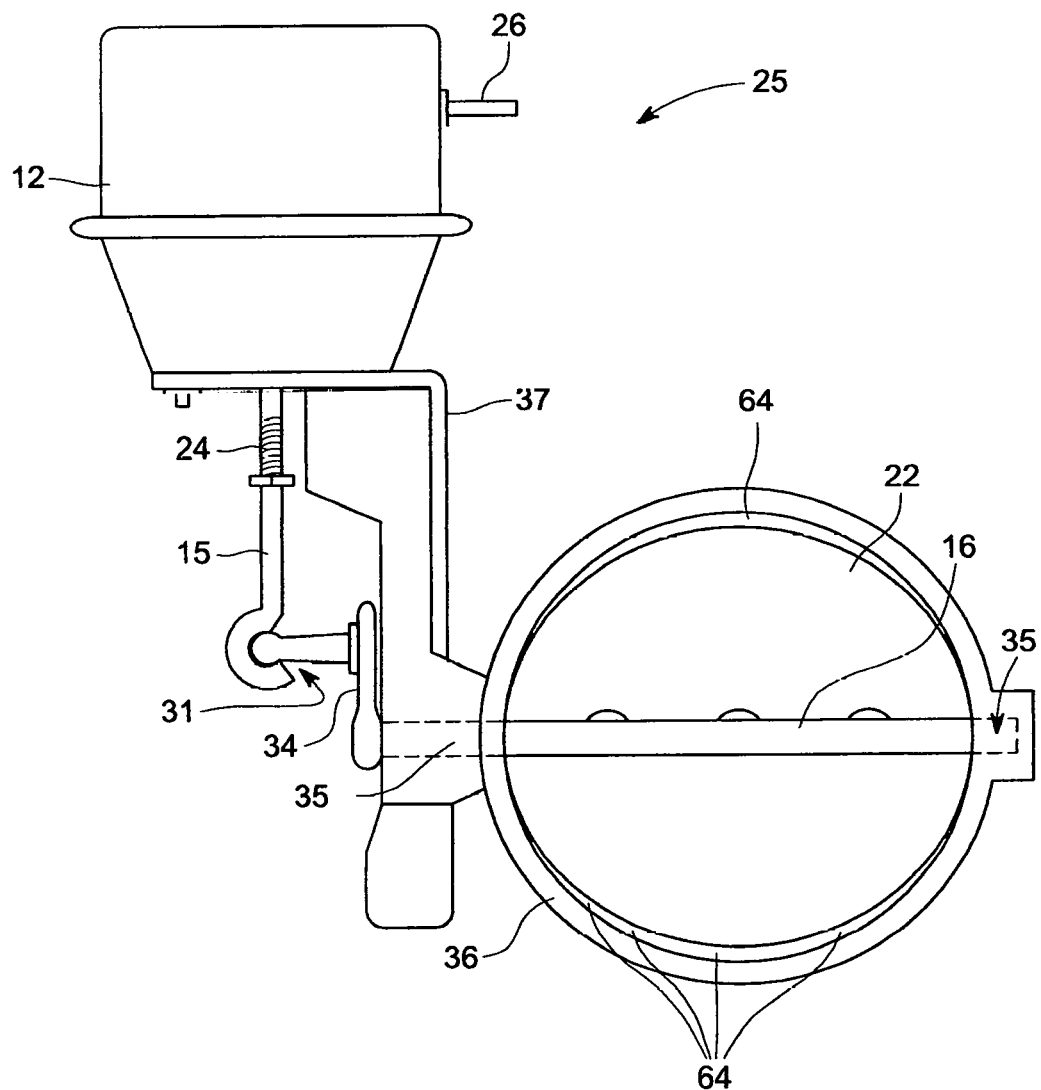
FIG. 2 is a frontal view of the EFID 25 showing the triggered position of the plate 22 which is almost closed just leaving enough room at the top and the bottom between the body 36 and the plate 22 for the idle air 64. The rod 14 has retracted into the vacuum chamber 12 with the adjustment threads 24 exposed lifting one end of the lever 34 whose other end is fixed to the shaft 16 which is also fixed to the plate 22 causing a partial rotation of the shaft 16 and the plate 22 by a little less than 90 degrees, the shaft 16 rotates within two fulcrum air tight holes 35 precision drilled 180 degrees apart within the body 36.
Figure 3:
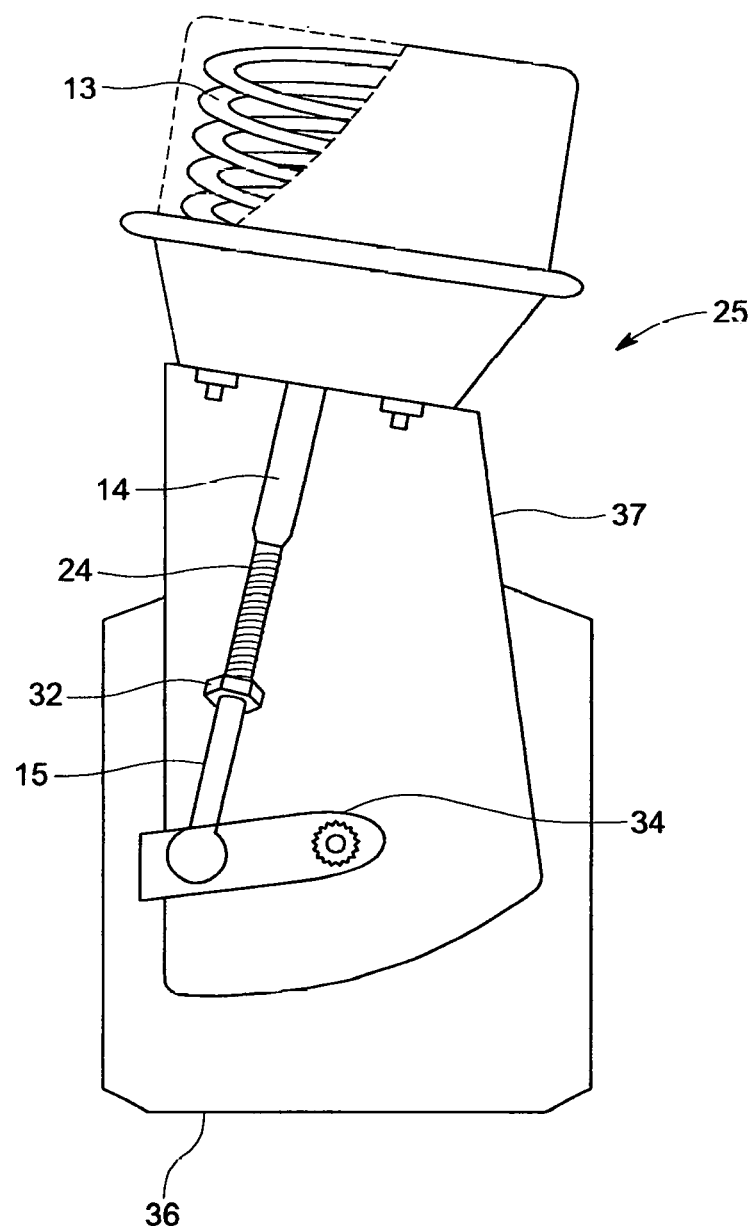
FIG. 3 is a side view of the EFID 25 showing the shaft lever 34 the body 36 and the jam nut 32. An internal view into the chamber 12 shows the tension return spring 13 that returns the retractor rod 14, the rod socket connector 15 and the lever 34 back to the normal operating position when only one pedal or no pedal is depressed.
Figure 4:
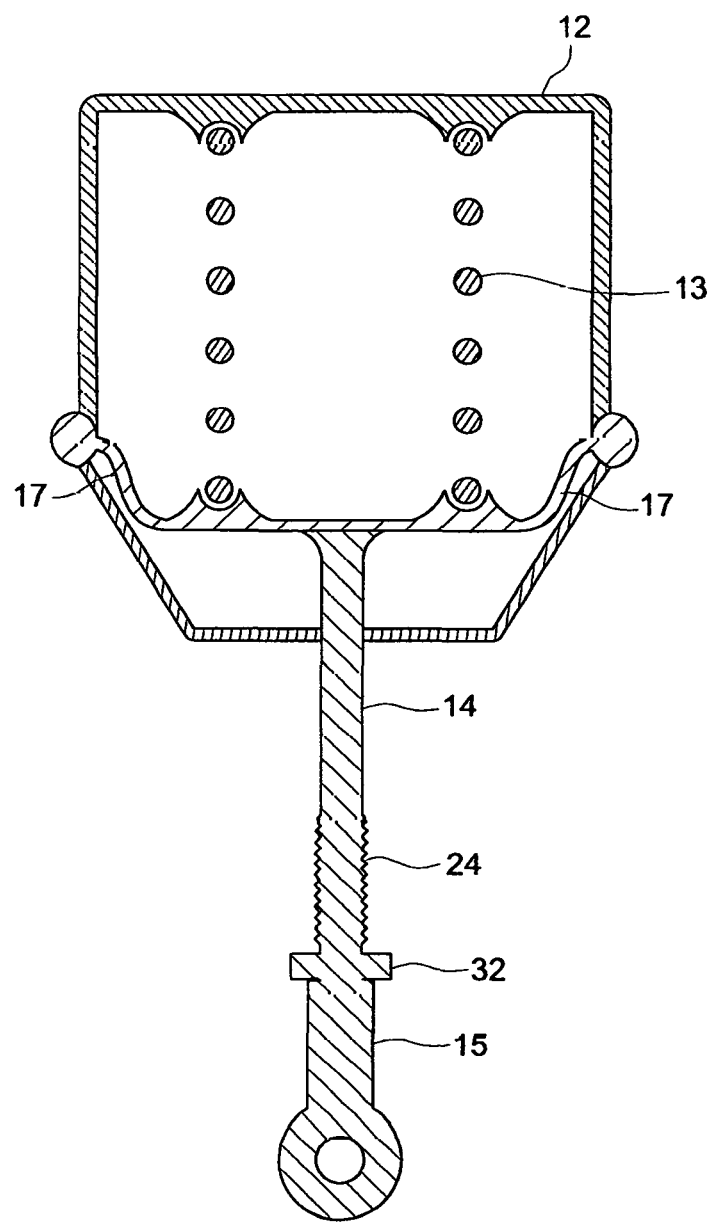
FIG. 4 is a cut away view of the vacuum chamber 12 showing the tension return spring 13 and the diaphragm 17.
Figure 5:
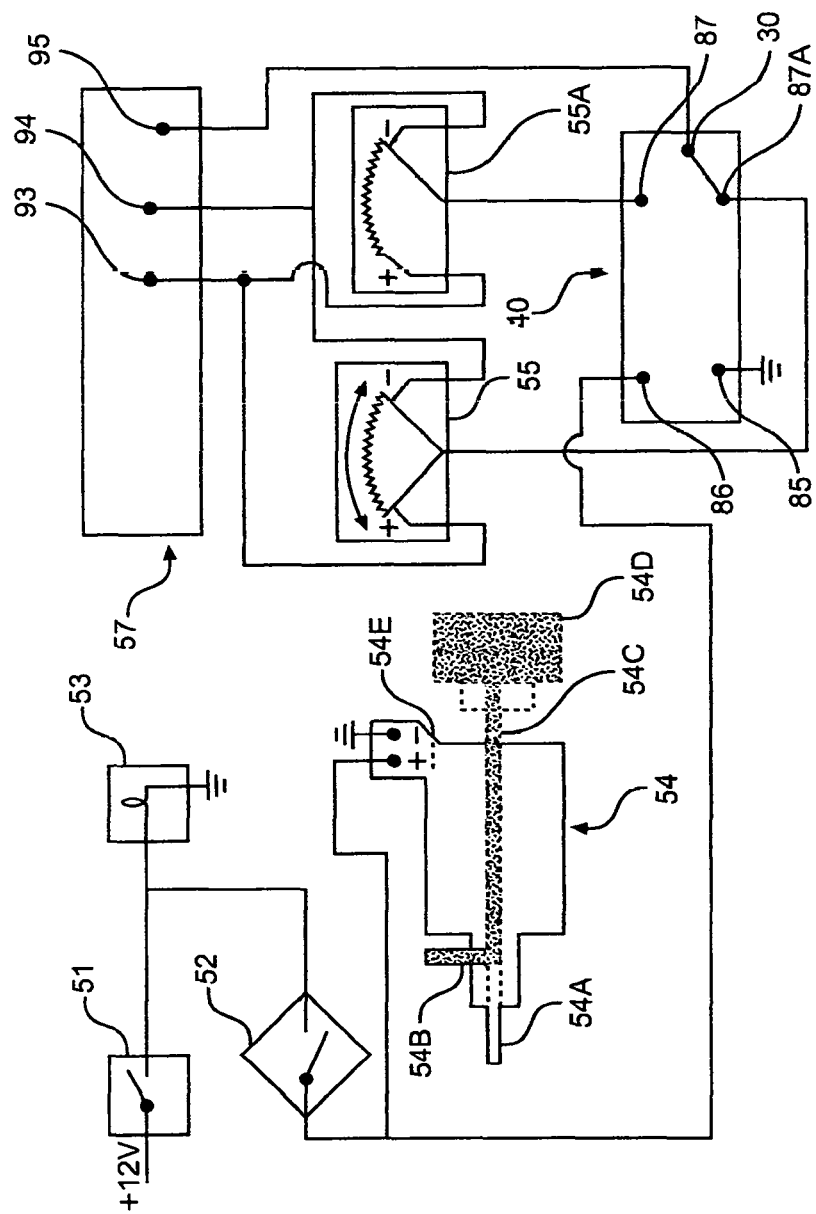
FIG. 5 is a schematic that shows the normal operation where neither the vacuum switch 54 nor the throttle position shuttle relay 40 are triggered. The ECU 57 reads the value of the throttle position switch 55 via the terminals 87A and 30 of the throttle position shuttle relay 40, the vacuum chamber 12 is vented to the atmosphere via the ports 26, 54B and 54C.
Figure 6:
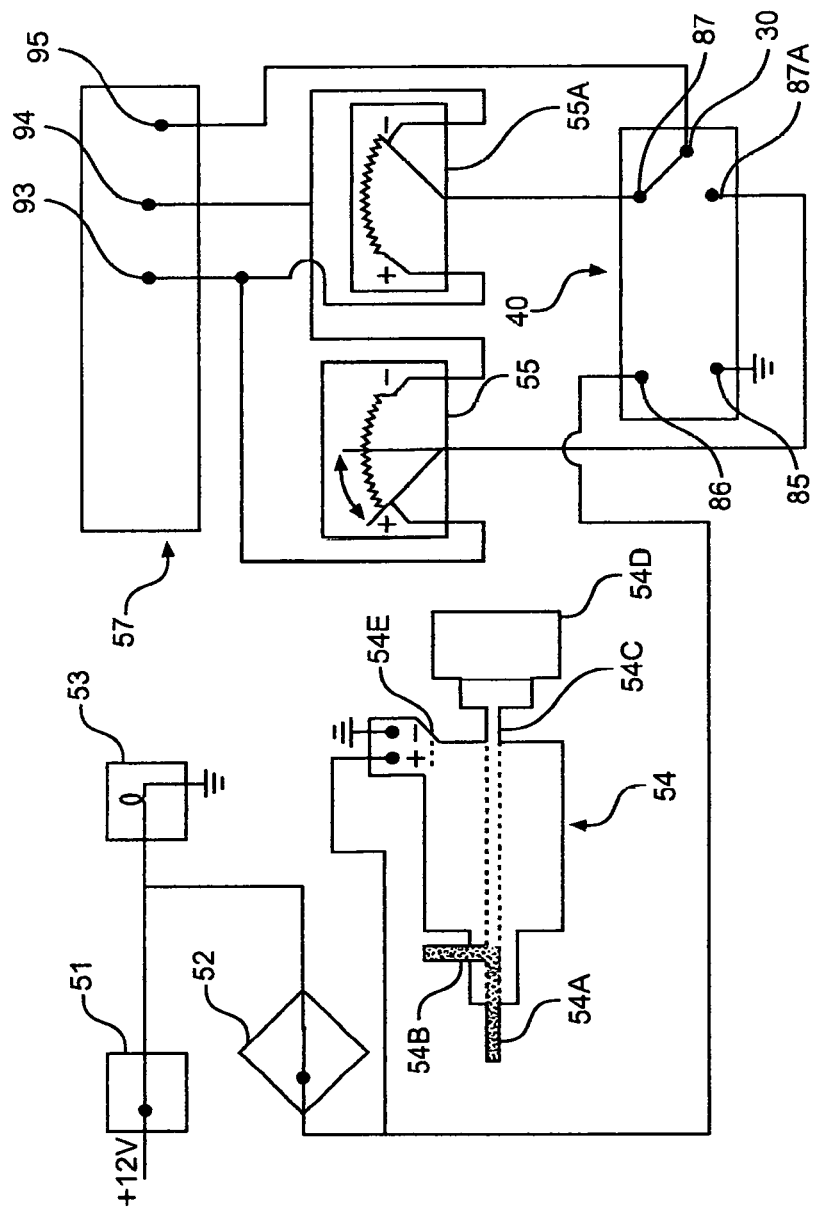
FIG. 6 is a schematic that shows when the brake light switch 51 is activated causing the brake light 53 to be illuminated. When the brake light switch 51 and the accelerator proximity switch 52 are triggered at the same time (foot depressing both the brake and the accelerator) both the vacuum switch 54 and the throttle position shuttle relay 40 are triggered. The vacuum switch 54 causes the vacuum to travel from the port 54A through the port 54B to the port 26 of the vacuum chamber 12 causing the plate to almost close just leaving small openings for the entry of the idle air 64. The triggered throttle position shuttle relay 40 causes an open circuit between the terminal 87A and the terminal 30 preventing the ECU 57 from monitoring the wayward throttle position switch 55 but instead monitors the throttle position switch 55A which is fixed at the idle end of the scale.
Figure 7:
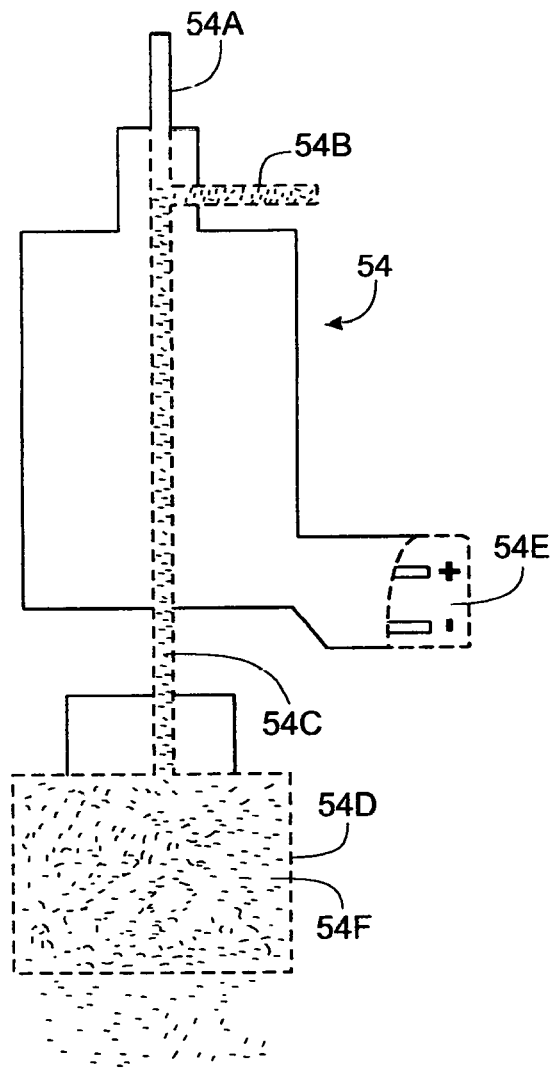
FIG. 7 is a view of the vacuum switch 54 in an un-triggered state allowing the vacuum chamber 12 to be vented to the atmosphere 54F via: the port 26, the connected vacuum line to the ports 54B, 54C and 54D respectively, which are all internally connected.
Figure 8:
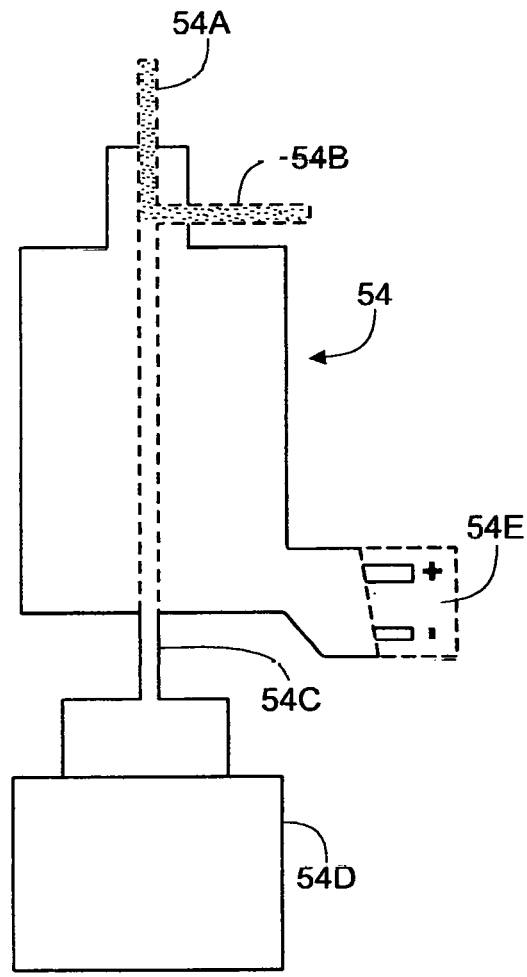
FIG. 8 is a view of the vacuum switch 54 in a triggered state where the vacuum travels from the port 54A through the port 54B, the port 54C is now closed.
Figure 9:
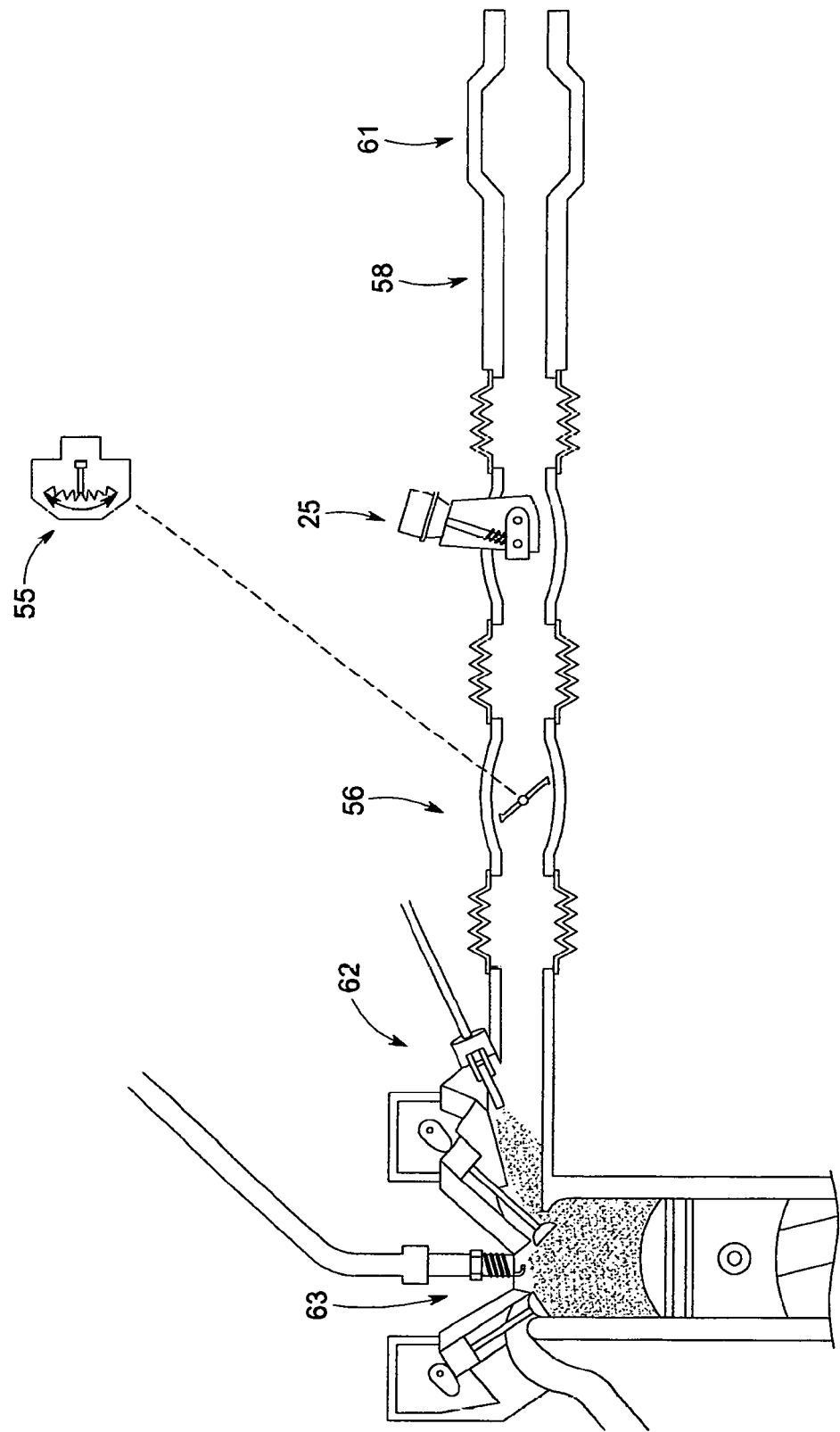
FIG. 9 is a layout of components in the induction tract.

A driver wearing a pair of work boots pulls his car into a parking spot in a parking garage. He applies the brakes, his car is equipped with the EFID, his right boot accidentally overlaps and presses down both the brake and the accelerator pedals at the same time. Instantly 12 volts travels from the brake light switch 51 to and through the closed proximity accelerator switch 52 it then triggers the grounded vacuum switch 54 allowing the engine vacuum to go from the port 54A through the port 54B to the port 26 via attached vacuum line activating the vacuum chamber 12 pulling up: the rod 14, the rod socket connector 15, the lever ball post 31 and one end of the attached lever 34 the other end of which is attached to the shaft 16 which is fulcrumed by two holes 35 machined 180 degrees apart within the body 36 and rotating the attached shaft 16 and the plate 22 by a little less than 90 degrees only leaving small spaces at both extremities to allow in enough air 64 to support idle (vide FIG. 2). The low volume air flow is sensed by the air mass sensor 58 which retards the ignition timing, at the same time the grounded throttle position shuttle relay 40 is triggered causing an open circuit between terminals 87A and terminal 30 and at the same time connecting terminal 87 to terminal 30 making the ECU agnostic of the wayward throttle switch 55, but now monitors the throttle position switch 55A which was already preset and fixed to the low end of the scale to predicate engine idle. The net effect is, although the brake and the accelerator are depressed the engine does not respond but completely ignores the wayward accelerator pedal and the brakes work normally, the engine is put in a state of forced idle.

The release of either or both pedals accomplish two things: First, it de-activates the vacuum solenoid switch 54 closing port 54A cutting off the vacuum source and opening ports 54B and 54C allowing the vacuum chamber 12 to be vented to the atmosphere via the ports 26, 54B, 54C and 54D, the tension spring 13 returns the plate 22 to the wide open position; Second, it de-activates throttle position shuttle relay 40 disconnecting terminals 87 from 30 and connects terminals 87A to 30 putting throttle position switch 55 back in service and returning the engine back to normalcy.

The EFID is necessary on all vehicles especially:
(1) Vehicles driven by senior citizens.
(2) Vehicles used for public transportation.
(3) Vehicles used by the disabled.

(4) vehicles used by driving schools.

(5) Vehicles operated by newly licensed drivers.

(6) Vehicles with a history of mysteriously speeding out of control during braking.

Variations of EFID Design

Figure 10:
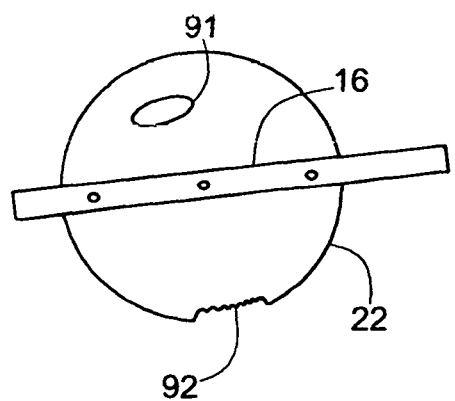
FIG. 10 is a possible alternative way of constructing the plate 22 with a hole 91 and a serration 92.

Another embodiment would be to machine a hole or many holes in the plate 22 or have a serration or many serrations on the edge of the plate 22 or a combination of both, in such a way that, the total accumulated area of the openings is adequate to allow the correct amount of the air 64 necessary to support the engine to idle, with this embodiment, the plate 22 would close completely (vide FIG. 10).

Figure 11:
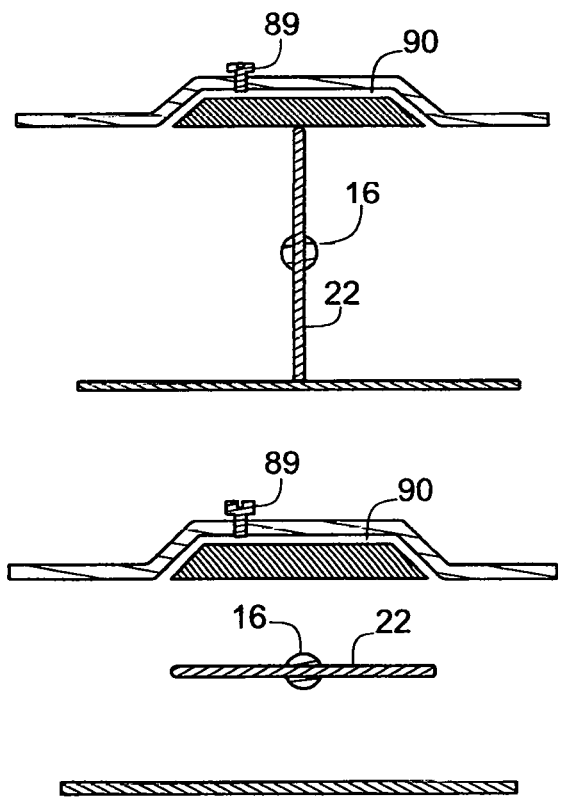
FIG. 11 is an alternative way of constructing the body 36 incorporating a bypass hole 90 to facilitate the engine idle when the solid plate 22 is completely closed.

Another embodiment would be to close the plate 22 completely and have a bypass hole 90 tunneled in the body 36 with an air adjustment screw 89 in such a way that the engine idle will be supported when the plate 22 closes. (vide FIG. 11). There is the option to use 12 or 24 volt solenoid to activate the lever 34. Air pressure could also be used to activate the lever 34 in the case of a vehicle that uses air brakes.

The EFID 25 could be placed anywhere within the induction tract. It could even be incorporated with either the air mass housing 58 or the throttle body housing 56.

I claim:

1. An emergency forced idle device for use with an automobile for improving safety, the automobile including an engine: an induction manifold; an accelerator pedal; a brake pedal for actuating the brakes, the emergency forced idle device comprising: an ECU (57) and circuitry, wherein the circuitry includes a vacuum switch (54), a throttle position shuttle relay (40), a first throttle position sensor (55) and a second throttle position sensor (55A) with a preset fixed idle voltage, wherein the ECU (57) and circuitry control the engine to idle and the brakes to continue working normally, when both the brake and the accelerator pedal are being pressed at the same time by increasing the intake manifold vacuum by actuating the vacuum switch (54), at the same time the activation of the throttle position shuttle relay (40) stops the ECU (57) from monitoring the throttle position sensor (55), but sends the preset idle voltage exiting the second throttle position sensor (55A) to the ECU (57).

2. An emergency forced idle device for use with an automobile for improving safety, the automobile including an engine: an induction manifold; an accelerator pedal; a brake pedal for actuating the brakes, the emergency forced idle device comprising: an ECU (57) and circuitry, wherein the circuitry includes a vacuum switch (54), a throttle position shuttle relay (40), a throttle position sensor (55) and an preset fixed idle voltage, wherein the ECU (57) and circuitry control the engine to idle and the brakes to continue working normally, when both the brake and the accelerator pedal are being pressed at the same time by increasing the intake manifold vacuum by actuating the vacuum switch (54), at the same time the actuation of the throttle position shuttle relay (40) stops the ECU (57) from monitoring the throttle position sensor (55), but instead forces the ECU (57) to monitor the available preset fixed idle voltage.

* * * * *